United States Patent Office 3,728,290
Patented Apr. 17, 1973

3,728,290
METHOD FOR THE PREPARATION OF A SEPARATION MEDIUM FOR GEL FILTRATION
Ingemar Haldor Johansson and Marius Klaus Joustra, Uppsala, Sweden, assignors to Pharmacia Fine Chemicals AB, Uppsala, Sweden
No Drawing. Filed Apr. 26, 1971, Ser. No. 137,664
Claims priority, application Sweden, Apr. 29, 1970, 5,958/70
Int. Cl. B01d 39/04; C08f 33/08, 47/08
U.S. Cl. 260—2.5 N    12 Claims

ABSTRACT OF THE DISCLOSURE

The present invention relates to an improved method for preparing a separating medium for gel filtration in which grains of a rigid hydrophilic macroporous copolymer of acrylamide (or 1-vinyl-12-pyrrolidinone) with N,N'-methylene-bis-acrylamide has copolymerized in its pores a second copolymer of one or more acrylamides (or 1-vinyl-2-pyrrolidinone) within N,N'-methylene-bis-acrylamide in the presence of an initiator (as set forth in U.S.P. 3,616,936) characterized in that the initiator is present in the pores of the rigid hydrophilic, macroporous copolymer when the copolymerizable substances of said second copolymer are introduced thereinto.

---

According to the above mentioned patent the separation medium is prepared by copolymerizing in the pores of a rigid, hydrophilic, macroporous copolymer of one of more acrylamides of the formula

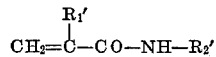

wherein $R_1'$ represents hydrogen, methyl or ethyl and $R_2'$ is hydrogen or a straight or branched lower alkyl group optionally substituted by one or more hydroxy and/or oxo groups, the carbon chain of which being optionally interrupted by one or more oxygen bridges, or of 1-vinyl - 2 - pyrrolidinone with N,N'-methylene-bis-acrylamide, said copolymer being obtained from an aqueous solution of the two substances in which the content of N,N'-methylene-bis-acrylamide is between 30 and 90 percent by weight of the total weight of the two substances, one or more acrylamides of the formula

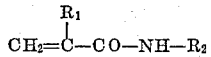

wherein $R_1$ and $R_2$ each have the same significance as given above for $R_1'$ and $R_2'$ respectively and may be identical to these substituents, with N,N'-methylene-bis-acrylamide in aqueous solution, the content of the two monomers in the aqueous solution essentially lying within the interval 1–20 g./dl., preferably 2–10 g./dl., and the content of N,N'-methylene-bis-acrylamide being between 0.5 and 10 percent by weight of the total weight of the two monomers, in the presence of an initiator.

Between the two polymerization steps of this process the rigid, hydrophilic, macroporous copolymer obtained in the first step was worked up, whereafter said copolymer was slurried into water and the two monomers to be used in the second polymerization step were added. As last component the initiator was added, whereafter excess liquid was filtered off and the residue was charged into a reaction vessel containing toluene and a surface active agent.

According to the present invention there has now surprisingly been found a method for the preparation of the separation medium in question by which method the above related work-consuming working up can be avoided.

The method according to the invention is characterized in that the initiator s present in the pores of the rigid, hydrophilic, macroporous copolymer when the copolymerizable substances are introduced thereinto.

According to an embodiment of the invention grains of the rigid, hydrophilic, macroporous copolymer are slurried in an aqueous liquid mixed with or containing the initiator so that the latter migrates into the pores, whereafter the copolymerizable substances are added to the slurry.

According to another embodiment grains of the rigid, hydrophilic, macroporous copolymer are prepared in a first reaction step while using an initiator and the copolymerization process is carried out using the same initiator without removing it between the two steps.

The invention will in the following be further illustrated by a number of working examples.

EXAMPLE 1

100 g. of fine grain chalk covered with calcium stearate and 5 g. of an emulsifier (dodecyl-phenoxy-poly-(ethyleneoxy)ethanol) were slurried in 1000 ml. of toluene in a reaction vessel placed in a water bath, the temperature of which was maintained at 50° C. 22.5 g. of methacrylamide and 27.5 g. of N,N'-methylene-bis-acrylamide were dissolved in 500 ml. of distilled water at 50° C. 1 g. of ammonium persulphate was added to the monomer solution as an initiator and the solution together with the initiator added thereto was introduced immediately into the reaction vessel. The two phase mixture was strongly stirred. After 15 minutes nitrogen gas was blown through the mixture to expel oxygen from the reaction vessel. After 1 hour solid beads had formed. Then another addition of monomer solution was performed, this time with no addition of initiator. 24.75 g. of acrylamide and 0.250 g. of N,N'-methylene-bis-acrylamide were dissolved in 50 ml. of distilled water. Then the solution was added to the reaction mixture in the reaction vessel. After 4 hours the stirring was interrupted and the beads were washed with dilute acetic acid, toluene, acetone and water.

The product was allowed to settle in a measuring glass, whereupon the yield was measured as 900 ml.

The rigidity of the obtained product was determined by subjecting it to flow tests. To these ends, the product was slurried in water and packed into a bed having a diameter of 5 cm. and a height of 10 cm. A gradually increasing hydrostatic pressure drop ($p$) was applied over the bed, whereupon the linear flow ($U$) and the bed height ($L$) was measured for each value of $p$. The permeability of the bed was then calculated by applying the expression $K = L \cdot U/p$. If $K$ is plotted on a logarithmic scale in a graph against the value of $p/L$ a straight line is obtained. The point at which the line intersects the ordinate gives the value of $K_0$. If the slope angle of the line is designated $\alpha$ the maximum flow ($U$) ($U_{max}$) is then obtained for the gel bed from the equation $$U_{max} = \frac{K_0}{\ln 10 \cdot tg\alpha \cdot e}$$

The exclusion limit, i.e. the upper limit of the molecular weight range within which a separation according to molecular size is obtained, was determined by a method in which some proteins of different molecular weights were chromatographed through a bed of the separating medium and that the $K_{av}$ values of said proteins were calculated. $K_{av}$ is a parameter which gives the penetration ability of the chromatographed substance in the separating medium and is defined as $$K_{av} = \frac{V_e - V_0}{V_t - V_0}$$

wherein $V_e$ = elution volume
$V_0$ = void volume
$V_t$ = bed volume
$K_{av}$ = 0 means that the chromatographed substance is completely excluded from the pores of the separating medium. The measured $K_{av}$ values for the different proteins were plotted in a graph against the logarithm of the molecular weight. The points in the graph were connected by a straight line and the approximate exclusion limit was obtained at the point where the line intersected the abscissa. In the present case $U_{max}$ for beads having an average diameter of 150 micrometers in wet condition was calculated to be 315 ml./cm.$^2$·h. and the exclusion limit was calculated to be approximately 600,000.

EXAMPLE 2

The method was effected in a manner similar to that described in Example 1.

In the first charge of monomers 22.5 g. of 1-vinyl-2-pyrrolidinone and 27.5 g. of N,N'-methylene-bis-acrylamide and in the second charge 18.7 g. of acrylamide and 0.2 g. of N,N'-methylene-bis-acrylamide were used. As the continuous phase n-heptane was used instead of toluene.

The yield was 850 ml.
Exclusion limit approximately 1,000,000.
Flow maxium ($U_{max}$) 200 ml./cm.$^2$·hour.

EXAMPLE 3

The method was carried out in a manner similar to that described in Example 1.

In the first charge 10 g. of acrylamide and 30 g. of N,N'-methylene-bis-acrylamide and in the second charge 42.8 g. of acrylamide and 0.8 g. of N,N'-methylene-bis-acrylamide were used.

The yield was 900 ml.
Exclusion limit approximately 150,000.
Flow maxium ($U_{max}$) 230 ml./cm.$^2$·hour.

EXAMPLE 4

The method was carried out in a manner similar to that described in Example 1.

In the first charge 20 g. of N-(hydroxymethyl)-acrylamide and 30 g. of N,N'-methylene-bis-acrylamide and in the second charge 26.7 g. of N-(hydroxymethyl)-acrylamide and 1.2 g. of N,N'-methylene-bis-acrylamide were used.

The yield was 650 ml.
Exclusion limit approximately 500,000.
Flow maxium ($U_{max}$) 240 ml./cm.$^2$·hour.

What we claim is:

1. Method for the preparation of a separation medium by copolymerizing in the pores of a rigid, hydrophilic, macroporous copolymer of one or more acrylamides of the formula

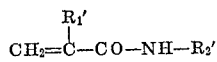

wherein $R_1'$ represents hydrogen, methyl or ethyl and $R_2'$ is hydrogen or a straight or branched lower alkyl group optionally substituted by one or more hydroxy and/or oxo groups, the carbon chain of which being optionally interrupted by one or more oxygen bridges, or of 1-vinyl-2-pyrrolidinone with N,N'-methylene-bis-acrylamide, said copolymer being obtained from an aqueous solution of the two substances in which the content of N,N'-methylene-bis-acrylamide is between 30 and 90% by weight of the total weight of the two substances, one or more acrylamides of the formula

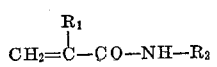

wherein $R_1$ and $R_2$ each have the same significance as given above for $R_1'$ and $R_2'$ respectively and may be identical to these substituents, with N,N'-methylene-bis-acrylamide in aqueous solution, the content of the two monomers in the aqueous solution essentially lying within the interval 1–20 g./dl. and the content of N,N'-methylene-bis-acrylamide being between 0.5 and 10 percent by weight of the total weight of the two monomers, in the presence of an initiator, characterized in that the initiator is present in the pores of the rigid, hydrophilic, macroporous copolymer when the copolymerizable substances are introduced thereinto.

2. Method according to claim 1, wherein grains of the rigid, hydrophilic, macroporous copolymer are slurried in an aqueous liquid mixed with or containing the initiator so that the latter migrates into the pores, whereafter the copolymerizable substances are added to the slurry.

3. Method according to claim 1, wherein grains of the rigid, hydrophilic, macroporous copolymer are prepared in a first reaction step while using an initiator and the copolymerization process in the pores is carried out using the same initiator without removing it between the two steps.

4. A method according to claim 1 wherein the rigid, hydrophilic, macroporous copolymer is formed from methacrylamide and N,N'-methylene-bis-acrylamide and the monomers copolymerizable therewith are methacrylamide and N,N'-methylene-bis-acrylamide.

5. A method according to claim 2 wherein the rigid hydrophilic, macroporous copolymer is formed from methacrylamide and N,N'-methylene-bis-acrylamide and the monomers copolymerizable therewith are methacrylamide and N,N'-methylene-bis-acrylamide.

6. A method according to claim 3 wherein the rigid, hydrophilic, macroporous copolymer is formed from methacrylamide, and N,N'-methylene-bis-acrylamide and the monomers copolymerizable therewith are methacrylamide and N,N'-methylene-bis-acrylamide.

7. The method according to claim 1 wherein said initiator is ammonium persulfate.

8. The method according to claim 2 wherein said initiator is ammonium persulfate.

9. The method according to claim 3 wherein said initiator is ammonium persulfate.

10. The method according to claim 1 wherein said rigid, hydrophilic, macroporous copolymer is formed from 1-vinyl-2-pyrrolidinone and N,N'-methylene-bis-acrylamide, and the material copolymerized in the pores thereof comprises acrylamide and N,N'-methylene-bis-acrylamide.

11. The method according to claim 2 wherein said rigid, hydrophilic, macroporous copolymer is formed from 1-vinyl-2-pyrrolidinone and N,N'-methylene-bis-acrylamide, and the material copolymerized in the pores thereof comprises acrylamide and N,N'-methylene-bis-acrylamide.

12. The method according to claim 3 wherein said rigid, hydrophilic, macroporous copolymer is formed from 1-vinyl-2-pyrrolidinone and N,N'-methylene-bis-acrylamide, and the material copolymerized in the pores thereof comprises acrylamide and N,N'-methylene-bis-acrylamide.

References Cited

UNITED STATES PATENTS 3,616,936  11/1971  Johansson et al. ____ 210—504
3,247,174   4/1966  Breitenbach et al. __ 260—874

SAMUEL H. BLECH, Primary Examiner
W. J. BRIGGS, SR., Assistant Examiner

U.S. Cl. X.R.

210—504; 260—2.5 B, 2.5 L, 80.3 N, 874, 877